May 5, 1931.  C. A. HANSON  1,803,703
LUBRICATING SYSTEM
Filed Aug. 1, 1925
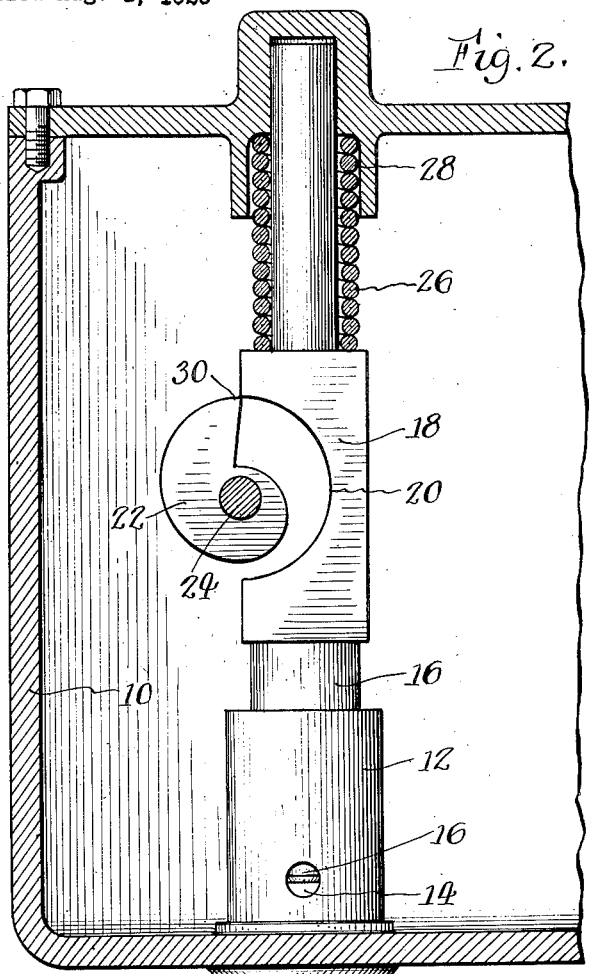
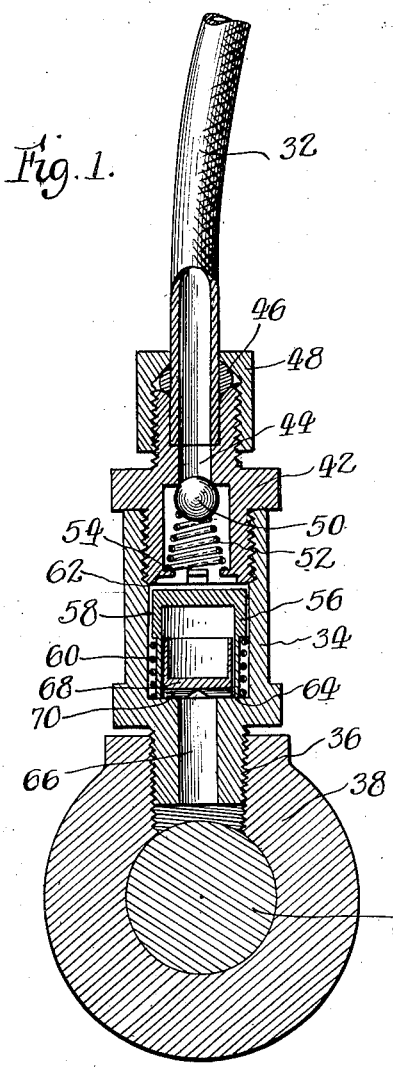
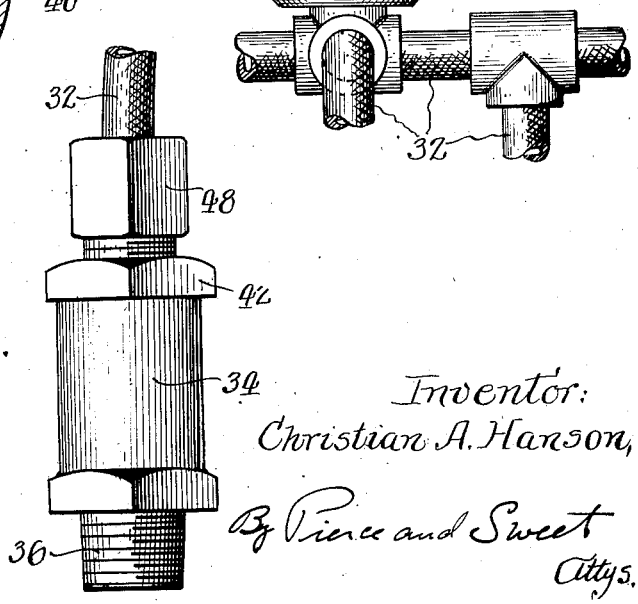
Inventor:
Christian A. Hanson,
By Pierce and Sweet
Attys.

Patented May 5, 1931

1,803,703

UNITED STATES PATENT OFFICE

CHRISTIAN A. HANSON, OF CHICAGO, ILLINOIS, ASSIGNOR TO ALEMITE CORPORATION, OF CHICAGO, ILLINOIS, A CORPORATION OF DELAWARE

LUBRICATING SYSTEM

Application filed August 1, 1925. Serial No. 47,531.

My invention relates to improvement in lubricating systems of the type commonly employed in connection with automotive vehicles.

Among the objects and advantages of the invention may be enumerated:

First, the provision of an improved lubricating system embodying centralized means for supplying lubricant to a plurality of bearings.

Second, the provision of a lubricating system, such as described, in which a single source of lubricant, under pressure, is connected with the bearings by one or more conduits that may be branched, or divided, to supply lubricant to a plurality of bearings so that it is not necessary to provide a conduit leading from the pump to each of the bearings.

Third, the provision of a lubricating system such as described, in which the source of lubricant under pressure may or may not include means for more or less accurately measuring the lubricant supplied to the bearings during each operation of the system.

Fourth, the provision of a simplified system such as described, in which means are provided at each of the bearings for apportioning the lubricant to said bearing.

Fifth, automatic compensation for differences in the resistance of the different bearings to entry of the lubricant, and the maintenance of a high pressure on a bearing of high resistance and a low pressure on one of less resistance, all independent of and without disturbance to the apportioning means.

Further objects and advantages of the invention will become apparent as the description proceeds.

In the accompanying drawings:

Figure 1 is a central axial section through an apportioning unit according to the invention.

Figure 2 is a section through one type of the supply device.

Figure 3 is a side elevation of the unit of Figure 1.

In the embodiment of the invention selected for illustration the source comprises a reservoir 10 containing a cylinder 12 having an inlet port 14 and receiving a plunger 16, shown at the top of its stroke. The plunger 16 is prolonged in an enlargement 18 having a cylindrical notch 20 opening laterally. A cam 22 engages in the notch 20 and is slowly rotated by the shaft 24. Any suitable means for rotating shaft 24 may be employed, and as the details of such means form no part of the present invention, it has not been deemed necessary to encumber the present description with such details. A stiff spring 26, fitting in a cup 28, pushes downward on the enlargement 18. When the toe 30 of the cam 22 moves out of the notch 20, the plunger will move down suddenly with great force and trap a charge of lubricant below the port 14, which charge will be forcibly expelled, under pressure corresponding to the spring tension, as fast as the system will absorb it.

A system of conduits 32 leads in various directions from the cylinder 12 to the various bearings to be lubricated. In each branch conduit, preferably at the end next the bearing, I position an apportioning unit.

The unit illustrated comprises the main body 34 threaded at 36 into the stationary element 38 forming a bearing for the moving element 40. A cap 42 closes the upper end of the body 34, having an inlet passage 44 communicating with the conduit 32, the end of which is suitably fastened in place as by means of a gripping element 46 and an annular clamping nut 48.

Within the chamber defined by the body 34 and the cap 42, I provide a check valve 50 held seated against the end of the inlet passage 44 by a suitable spring 52. This spring may be seated on lugs 54 broached out of the end of the cap 42.

The measuring valve means I have disclosed comprises a cup 56 having a clearance at 58 sufficient to permit slow seepage of oil past the cup, and a biasing spring 60 tending to hold the cup seated against the lower edge 62 of the cap 42 to function also as a check valve. Displacement of the cap 56 toward the bearing is limited by abutment of its lower edge with a shoulder 64, forming the end of the chamber and marking the beginning of the exit passage 66 leading to the bearing.

Between the measuring means and the bearing, in a hydraulic rather than a geometric sense, I provide resilient means for storing lubricant in excess of that taken by the bearing. I have illustrated a smaller cup 68 telescoped and freely slidable in the cup 56, and preferably inverted. To establish communication with the exit passage 66 the bottom of the cup 68 is provided with V-shaped grooves 70.

It will be apparent that when each pressure impulse arrives through conduit 32, the check valve 50 will open and the cup 56 move down to the position shown in Figure 1. During this movement a charge predetermined with substantial accuracy will move into and through the exit passage 66. After the lower edge of the cup 56 is seated on the shoulder 64, the check valve 50 will close, and after the pressure impulse ceases, the spring 60 will slowly return the cup 56 to the upper seat 62. During this movement a charge equal to that delivered to the exit passage 66 will pass through the clearance 58 for delivery on the next pressure impulse.

If the amount of lubricant delivered on each operation is not immediately absorbed by the bearing, and it usually will not be absorbed, the excess will compress the air inside the cup 56, moving the cup 68 up. In this way, a bearing of high resistance will force the cup 68 well up in the cup 56, generating a high pressure which will be maintained on the bearing throughout the periods between the pressure impulses to force the bearing to take the quota of lubricant predetermined for it by the operation of the measuring valve. A bearing of less resistance will maintain a considerably smaller reserve stored in the cup 56 and receive its lubricant at materially lower pressure. Both bearings will receive the amount of lubricant they ought to have, and the pressure will automatically adjust itself to that necessary to force the lubricant into each bearing.

When the unit of Figure 1 is employed in connection with such a source of supply as that of Figure 2, the pump should obviously be of sufficient capacity to assure a full stroke for all the valves associated with it.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:

1. A lubricating system comprising means acting periodically to deliver charges of lubricant under pressure, a conduit conveying said charges, a resilient pneumatic capsule in said conduit, a seat for one portion of said capsule, means tending to hold said capsule portion against said seat and thus check return flow from the space around said capsule, a second seat opposite said first seat, said capsule portion having predetermined travel between said two seats, and a check valve in series with said capsule, whereby return of the capsule portion passes a predetermined charge of lubricant around the same.

2. A lubricating system comprising means acting periodically to deliver lubricant under pressure, a conduit conveying said lubricant, a resilient capsule in said conduit, a seat for one portion of said capsule, means tending to hold said capsule portion against said seat and thus check return flow from the space around said capsule, a second seat opposite said first seat, said capsule portion having predetermined travel between said two seats, whereby return of the capsule portion passes a predetermined charge of lubricant around the same.

3. Lubricant conveying means comprising a chamber, a measuring valve longitudinally movable in said chamber to segregate a predetermined quantity of lubricant and thereafter to force such predetermined quantity toward a bearing requiring lubrication, and a resilient pneumatic capsule in the discharge end of said measuring valve for storing that part of the predetermined quantity of lubricant segregated by the measuring valve and which is not immediately required by the bearing.

4. Lubricant conveying means comprising a chamber, a measuring valve in said chamber for segregating a predetermined quantity of lubricant and thereafter urging said predetermined quantity toward a bearing requiring lubrication, and a resilient capsule in the discharge end of said measuring valve for storing that part of the predetermined quantity in excess of the immediate needs of said bearing.

5. Lubricant conveying means comprising a cylindrical chamber, a measuring valve in said chamber for segregating a predetermined quantity of lubricant and forcing such predetermined quantity toward a bearing requiring lubrication, and a resilient capsule in said measuring valve for receiving that part of said predetermined quantity in excess of the immediate needs of said bearing and for thereafter supplying said excess to said bearing.

6. Lubricant conveying means comprising a chamber, a measuring valve in said chamber, and a resilient capsule also in said chamber, said valve and capsule having one element in common.

7. Flow control means for lubricating systems comprising reversely faced telescoped cups having appreciable clearance for free sliding, a filling of gas inside said cups, a chamber having an inlet and an outlet, said chamber housing both cups and allowing the outer cup longitudinal play, and a spring tending to seat the outer cup against the inlet of said chamber to check return flow from said chamber.

8. A lubricant apportioning means comprising a body member having a cylindrical bore with an inlet port at one end and an outlet port at the other end, a cup reciprocable in said bore and opening toward said outlet port, a spring for yieldingly holding the bottom of said cup in position to close said inlet port, and a second cup freely slidable in said first named cup.

9. A lubricant apportioning means comprising a body member having a cylindrical bore with an inlet port at one end and an outlet port at the other end, and telescopic means slidable in said bore and forming a check valve for said inlet and outlet ports, a measuring device and a storage chamber.

10. A lubricant apportioning means comprising a body member having a cylindrical bore with an inlet port at one end and an outlet port at the other end, and telescopic means slidable in said bore and forming a check valve for said inlet port, a measuring device and a storage chamber.

11. A lubricant apportioning means comprising a body member having a cylindrical bore with an inlet port at one end and an outlet port at the other end, and telescopic means slidable in said bore and forming a measuring device, and a storage chamber.

12. A lubricant apportioning means comprising a body member having a cylindrical bore with an inlet port at one end and an outlet port at the other end, and telescopic means slidable in said bore and forming a check valve for said inlet and outlet ports.

In witness whereof, I hereunto subscribe my name this 14th day of July, 1925.

CHRISTIAN A. HANSON.